United States Patent [19]

Bankuti et al.

[11] Patent Number: 5,801,484
[45] Date of Patent: Sep. 1, 1998

[54] COMPACT FLUORESCENT LAMP DISCHARGE TUBE AND METHOD FOR CLOSING

[75] Inventors: Laszlo Bankuti, Budapest; Peter Ormai; Karoly Talosi, both of Nagykanizsa; Jozsef Tokes, Budapest; Zoltan Vamos, Budapest; Istvan Wursching, Budapest; Zsolt Micsinai, Nagykanizsa, all of Hungary

[73] Assignee: General Electric Company, Schenectady, N.Y.

[21] Appl. No.: 671,916

[22] Filed: Jun. 28, 1996

[30] Foreign Application Priority Data

Jul. 5, 1995 [HU] Hungary ................ 95 02047

[51] Int. Cl.⁶ ............... H01J 1/62; H01J 63/04; H01J 17/16; H01J 61/30
[52] U.S. Cl. ........................... 313/493; 313/634
[58] Field of Search ........................ 313/488, 490, 313/491, 492, 493, 634, 318.01–318.12; 445/22, 23, 26

[56] References Cited

U.S. PATENT DOCUMENTS 4,871,994  10/1989  Skwirut et al. ............... 313/493 X
5,381,073  1/1995   Godyak et al. ............... 313/493 X
5,606,218  2/1997   Cotter et al. ................. 313/491 X

*Primary Examiner*—Sandra L. O'Shea
*Assistant Examiner*—Mark Hayns
*Attorney, Agent, or Firm*—Fay, Sharpe, Beall, Fagan, Minnich & McKee

[57] ABSTRACT

The invention relates to the discharge tube of a compact fluorescent lamp which discharge tube, being sealed hermetically and provided with appropriate fill, comprises at least two tube portions connected with each other, and electrodes are placed at the ends of the first and last tube portions, and lead wires protrude through the glass wall of the discharge tube to the electrodes. The invention also relates to a method for closing at least one of the tube portions forming a part of the discharge tube of a compact fluorescent lamp. The essential feature of the discharge tube according to the invention is that at least one of these tube portions is closed by a curved surface having tangents which, starting from the axis of the tube portion and extending to the cylindrical wall thereof, make a monotonously decreasing angle with the axis of the tube portion.

8 Claims, 1 Drawing Sheet

COMPACT FLUORESCENT LAMP DISCHARGE TUBE AND METHOD FOR CLOSING

FIELD OF THE INVENTION

The invention relates to the discharge tube of compact fluorescent lamps which discharge tube, being sealed hermetically and provided with appropriate fill, comprises at least two glass tube portions connected with each other.

The invention also relates to a method for closing at least one of the tube portions forming a part of the discharge tube of compact fluorescent lamps.

The term "glass" mentioned above includes all kinds of glass materials, e.g. quartz glass.

BACKGROUND OF THE INVENTION

It is known that, for closing the ends of the compact fluorescent lamp disposed closer to its base part, three fundamental methods have widespread use in the manufacture of compact fluorescent lamps. One of these is to use pinching for closing both the electrode-containing and the blank ends of the tube portions of the discharge tube. The second and third methods are: sealing the flanged portions of the stems supporting the electrodes in the tube portions for closing electrode-containing ends, and bottom-forming made in a plane perpendicular to the longitudinal axis of the tube portions for closing blank portions, respectively.

Both in the case of the above mentioned pinching and bottom-forming method, a remarkable extent of light output loss occurs. This is caused by the fact that an edge or a bend of small radius is produced at the place of closing through which the light leaves the compact fluorescent lamp towards its base part which results in light output loss.

SUMMARY OF THE INVENTION

The objective of our invention was to provide a solution which reduces the above light output loss.

The recognition that has led to our invention was that the light output loss may be reduced by closing the end(s) of one or more tube portions of the discharge tube of the compact fluorescent lamp which end(s) is (are) closer to the base part so that no edge or bend with small radius is produced on the glass.

According to the invention, the objective set can be achieved if the end(s) of at least one of the tube portions is closed by a curved surface having tangents which, starting from the axis of the tube portion and extending to the cylindrical wall of it, make a monotonously decreasing angle with the axis of the tube portion. Based on our experience, the best results can be attained in case of a hemispherical curved surface.

In accordance with the above, our invention is a discharge tube of a compact fluorescent lamp which discharge tube, being sealed hermetically and provided with appropriate fill, comprises at least two glass tube portions connected with each other. Here, electrodes are placed at the ends of the first and the last tube portions. Lead wires protrude to these electrodes through the glass wall of the discharge tube, and at least one of these tube portions is closed by a curved surface having tangents which, starting from the axis of the tube portion and extending to the cylindrical wall of it, make a monotonously decreasing angle with the axis of the tube portion.

In an embodiment according to the invention, the curved surface may be formed to have the shape of a paraboloid, ellipsoid, etc. It has been found, however, that the most preferred embodiment may be carried out by forming the curved surface to have the shape of a hemisphere, the diameter of which is equal to that of the tube portion.

With respect to the wall strength of the discharge tube, it is practical if the end of the tube portion closed by the curved surface has a uniform wall thickness.

Furthermore, our invention is a method for closing a tube portion forming a part of the discharge tube of compact fluorescent lamps. This discharge tube is sealed hermetically and is provided with appropriate fill and comprises more than two glass tube portions connected with each other and electrodes are placed at the ends of the first and the last tube portions. At the ends close to the base part of the compact fluorescent lamp, lead wires protrude to these electrodes through the glass wall of the discharge tube. At least one of the ends of the tube portions being close to the base part is closed by heating the end of the tube portion until the glass liquefies and melts together to make a closed portion. Then a mold consisting of two halves is closed to surround the liquefied glass while gas is blown into the glass portion to form the glass to the shape of the mold.

In the preferred embodiment according to the invention, the inside of the mold is a curved surface, preferably a hemispherical surface having tangents which, starting from the axis of the tube portion and extending to the cylindrical wall of it, make a monotonously decreasing angle with the axis of the tube portion.

In order to ensure the required strength of the glass at the place of closing, it is practical to wipe off the phosphor coating applied to the inside of the tube portions at their ends prior to starting the heating operation.

The advantage of the solution according to the invention is that the closed tube portion will have no edges or bends with small radius which results in decreasing the light output loss occurring otherwise at such edges or bends. It represents a further advantage that a uniform wall thickness of the closed portions can be ensured without sophisticated manufacturing process. Due to this, a shorter annealing time will be sufficient during the operations of the manufacturing process which results in less faulty product coming from broken glass. In the of using the method according to the invention for closing the tube portions, the discharge tube of the compact fluorescent lamp can be more readily fit into the openings formed in the base part, and can be fixed in the base part with less adhesive than with the pinched seal.

BRIEF DESCRIPTION OF THE DRAWINGS

The invention will be illustrated in details with an embodiment, by means of a drawing figure.

DETAILED DESCRIPTION OF THE DRAWINGS

Figure 1:
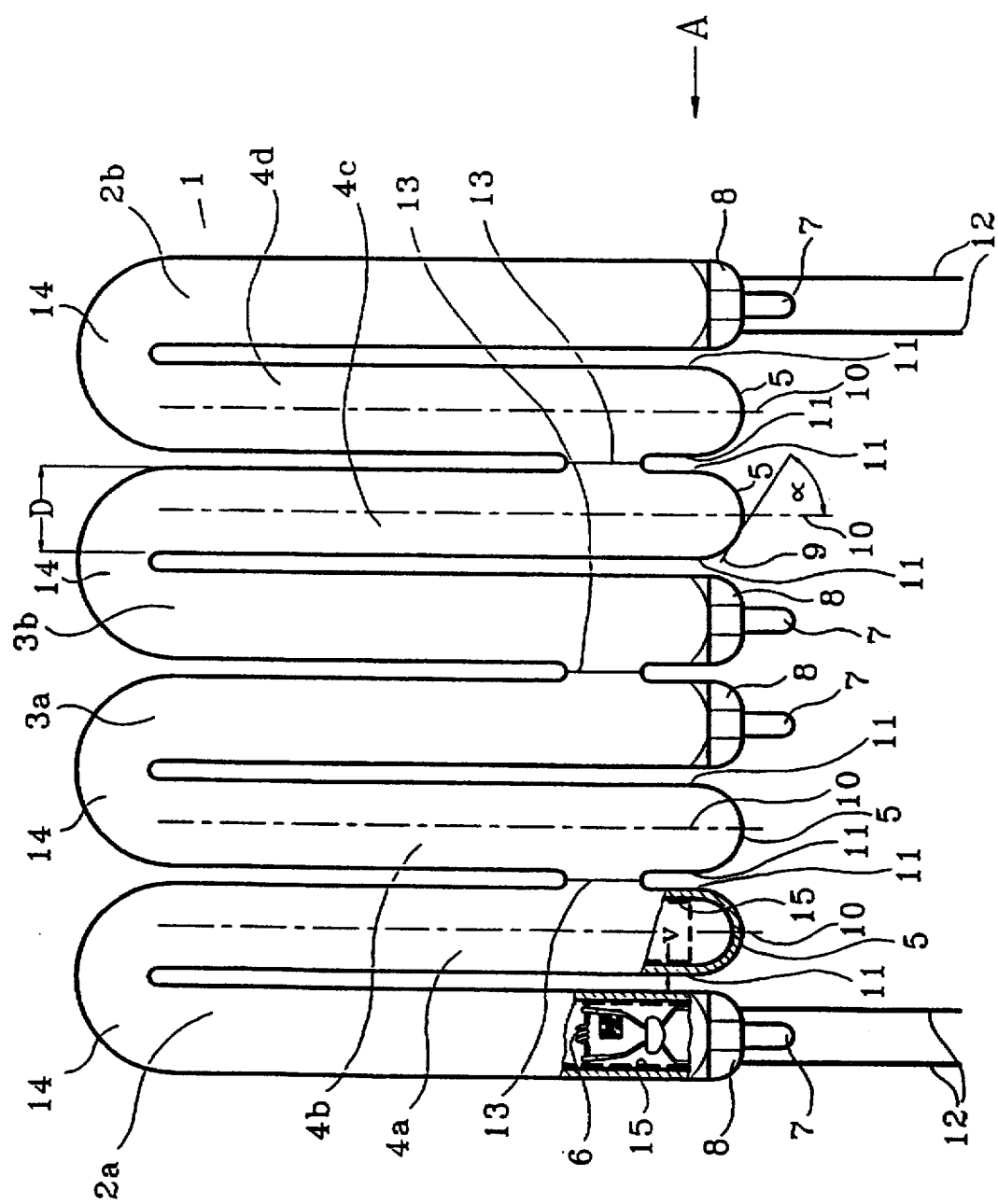
FIG. 1 is the outspread drawing of the embodiment of the compact fluorescent lamp according to the invention.

In the figure, discharge tube 1 of a so-called OCT-type compact fluorescent lamp is shown which discharge tube 1 is sealed hermetically and is provided with the appropriate fill. The discharge tube 1 comprises straight tube portions 2a, 4a, 4b, 3a, 3b, 4c, 4d, 2b (as viewed from left to right in FIG. 1). These tube portions are made, e.g., from magnesia glass and coated with the appropriate phosphor 15 on the inside surface, have an equal wall thickness v and an equal diameter D, and are connected with each other in series by bends 14 and bridges 13. The discharge tube 1 has eight tube portions, and tube portions 2a, 2b accept electrodes 6, and lead wires 2 protrude to the said electrodes 6. Exhaust tubes 7, playing a role primarily in manufacturing, are placed at the ends of the tube portions 2a, 2b, 3a and 3b. The tube portions 2a, 2b, 3a and 3b are sealed by a conventional pinch 8. It is shown in the figure that the end of the tube portion 4c being closer to the base part is closed by a curved surface 5 having tangents 9 which, starting from the axis 10 of the tube portion 4c and extending to the cylindrical wall 11 of it, make a monotonously decreasing angle α with the axis 10 of the tube portion 4c. It is also seen that the tube portions 4a, 4b and 4d are closed by this same curved surface 5. The arrow A indicates the ends of the tube portions 2a, 4a, 4b, 3a, 3b, 4c, 4d, 2b placed at the side of the base part (not shown). The figure shows that each of the curved surfaces 5 in the embodiment is formed to have the shape of a hemisphere, and the diameter of it is equal to the diameter D of the tube portions 2a, 4a, 4b, 3a, 3b, 4c, 4d, 2b, and the wall thickness of the hemispherical shaped closed portions is equal to the wall thickness v of the cylindrical wall.

As an example, closing the tube portions 4a, 4b, 4c and 4d may be carried out using the following method.

The operation of closing is performed prior to connecting the tube portions 2a, 4a, 4b, 3a, 3b, 4c, 4d, 2b fully, i.e. prior to making bridges 13. Now, the tube portions are arranged in the following pairs: 2a–4a, 4b–3a, 3b–4c, 4d–2b, and each of these pairs will be closed using the method according to the invention. The method is performed after the electrodes 6 and the exhaust tubes 7 are placed in the tubes but the exhaust tubes 7 are still open. Prior to closing, the phosphor coating 15 applied earlier to the inside of the tube portions 4a, 4b, 4c, 4d is wiped off at their ends before their heating. Then, closing is started by pairs of tube portions in the way that, e.g., the end of the tube portion 4a is heated until the glass liquefies and melts together to make a closed portion. After this, a mold consisting of two halves is closed to surround the liquefied glass while gas is blown into the tube portion 2a through the exhaust tube 7 and the glass is formed to the shape of the mold. This same operation is performed on all the pairs of tube portions, together with the appropriate annealing treatment. Having done this, the bridges 13 may be produced, and the gas fill may be introduced and the exhaust tubes 7 may be tipped off.

Of course, the solution according to the invention may be used in the case of discharge tubes without phosphor coating as well. In this case the operation of wiping the phosphor coating off is not used. The solution according to the invention is advantageous first of all in the case of discharge tubes comprising four or more tube portions.

The solution according to the invention may be implemented in several ways. Therefore, it is not intended to be limited to the embodiment described above but only to the scope of protection determined by the claims.

What is claimed is:

1. A discharge tube of a compact fluorescent lamp where the discharge tube, being sealed hermetically and provided with appropriate fill, comprises at least two tube portions connected with each other, and electrodes are placed at the ends of the first and the last tube portions, and lead wires protrude through the glass wall of the discharge tube to the electrodes characterized in that at least one of these tube portions is closed by a curved surface having tangents which, starting from the axis of the tube portion and extending to the cylindrical wall thereof, make a monotonously decreasing angle with the axis of the tube portion.

2. The discharge tube according to claim 1 characterized in that the curved surface is represented by a hemisphere the diameter of which is equal to the diameter of the tube portion.

3. The discharge tube according to claim 1 characterized in that the end of the tube portion closed by the curved surface has a uniform wall thickness.

4. The discharge tube according to claim 2 characterized in that the end of the tube portion closed by the curved surface has a uniform wall thickness.

5. A compact fluorescent lamp comprising:
   a base;
   a hermetically sealed discharge tube extending outwardly from the base and having first and second tube portions;
   electrodes provided in first and second ends of the discharge tube;
   a fill in the discharge tube;
   lead wires extending through the first and second ends and electrically connected to the electrodes for exciting the fill to a discharge state; and
   at least one of the first and second tube portions being closed by a curved surface having tangents which, starting from an axis of the at least one tube portion and extending to the cylindrical wall thereof, forms a monotonously decreasing angle with the axis of the at least one tube portion.

6. The discharge tube of claim 5 wherein the curved surface is represented by a hemisphere the diameter of which is equal to the diameter of the tube portion.

7. The discharge tube of claim 6 wherein the end of the tube portion closed by the curved surface has a uniform wall thickness.

8. The discharge tube of claim 5 wherein the end of the tube portion closed by the curved surface has a uniform wall thickness.

* * * * *